United States Patent [19]

Widmer et al.

[11] 4,390,208
[45] Jun. 28, 1983

[54] INERTIA RESPONSIVE SEAT BACK LATCHING MECHANISM

[75] Inventors: Paul Widmer, Warren; Robert R. Mercer, Ortonville, both of Mich.

[73] Assignee: General Motors Corporation, Detroit, Mich.

[21] Appl. No.: 257,650

[22] Filed: Apr. 27, 1981

[51] Int. Cl.³ .............................................. B60N 1/02
[52] U.S. Cl. .................................... 297/379; 297/216
[58] Field of Search ................................ 297/379, 216

[56] References Cited

U.S. PATENT DOCUMENTS

| | | | |
|---|---|---|---|
| 2,873,794 | 2/1959 | Leslie et al. | 297/379 |
| 4,118,067 | 10/1978 | Tanaka | 297/379 |
| 4,147,386 | 4/1979 | Stolper | 297/362 |
| 4,165,128 | 8/1979 | Strowick et al. | 297/379 X |
| 4,252,370 | 2/1981 | Klating et al. | 297/379 |
| 4,318,569 | 3/1982 | Bilenchi et al. | 297/379 |

Primary Examiner—William E. Lyddane
Attorney, Agent, or Firm—W. A. Schuetz

[57] ABSTRACT

An inertia responsive latching mechanism for latching a tiltable seat back rest to a seat is disclosed and in which the latching mechanism is operable to normally latch the seat back rest in its fully upright position, allow slow forward tilting movement of the seat back without manual manipulation of the latch mechanism and prevent significant forward tilting movement of the seat back rest irrespective of its upright position upon being subjected to rapid deceleration forces.

4 Claims, 6 Drawing Figures

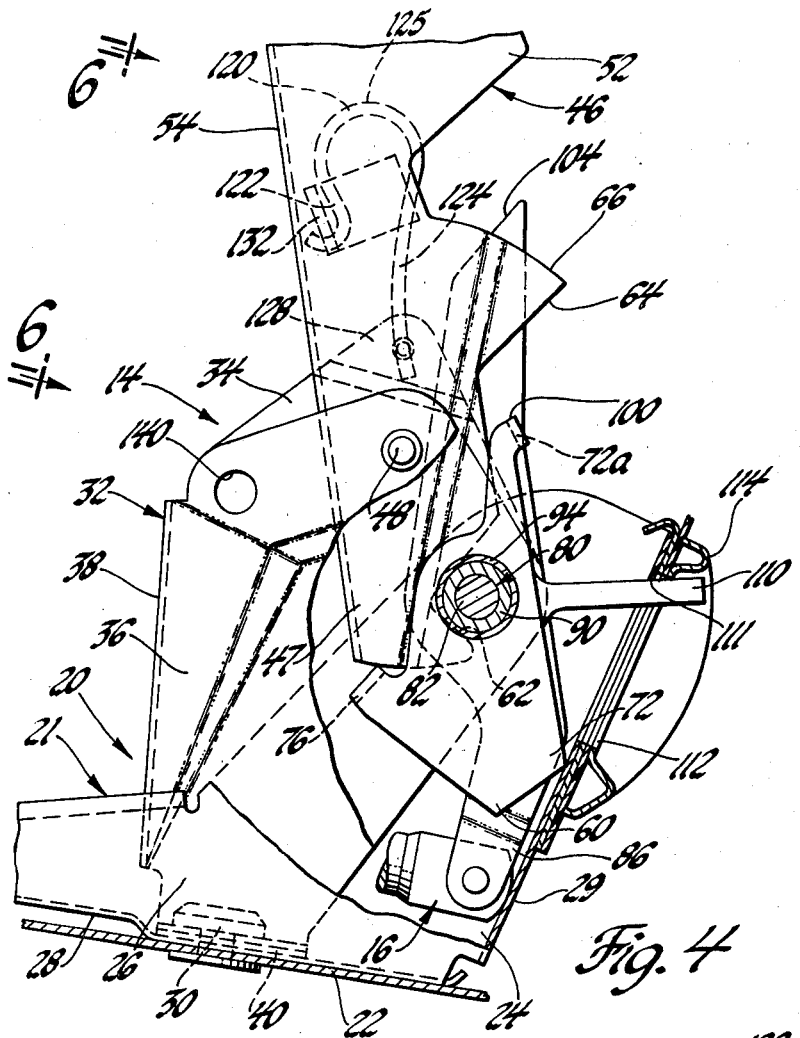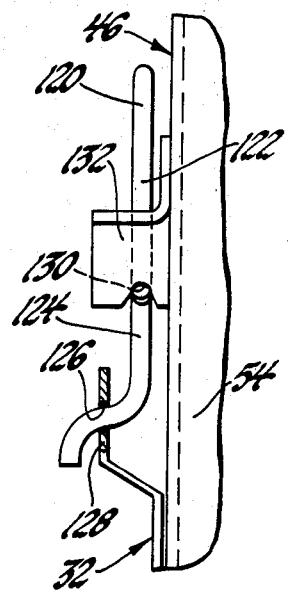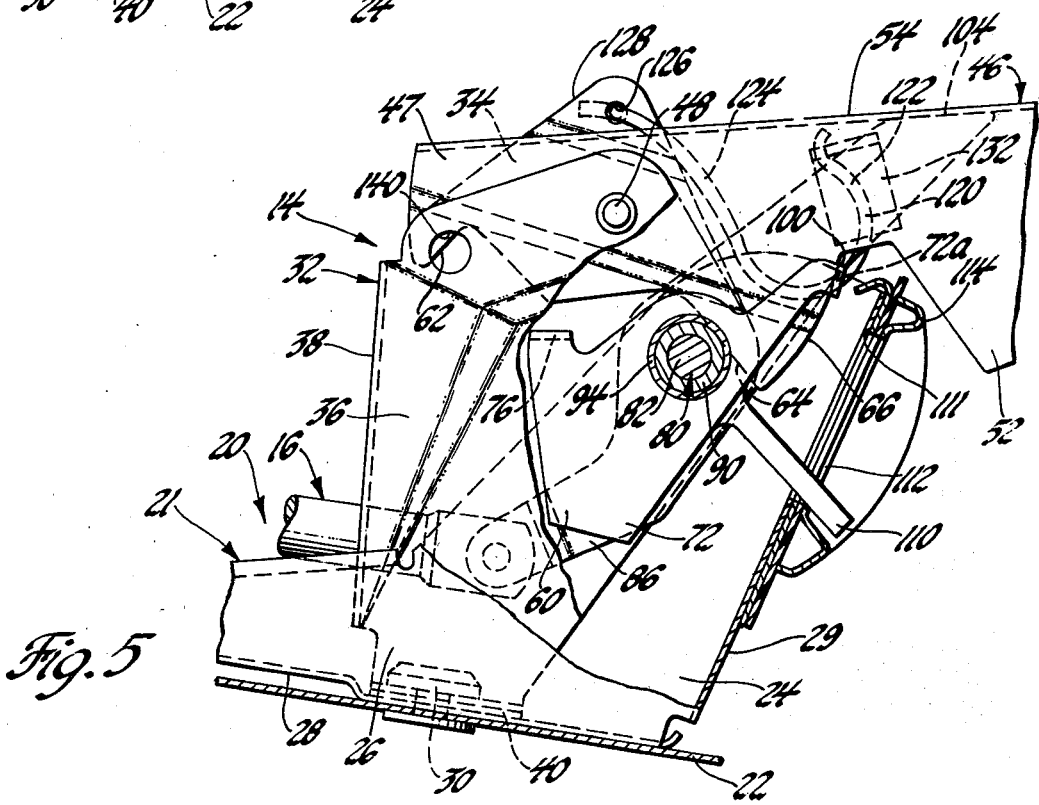

INERTIA RESPONSIVE SEAT BACK LATCHING MECHANISM

The present invention relates to a seat assembly for automotive vehicles, and more particularly to a novel latching mechanism for seats having tiltable back rests and which is operable to normally latch the back rest against forward movement when in a normal upright position, which allows slow forward tilting movement of the seat back without manual manipulation of the latch mechanism and which prevents significant forward tilting movement upon rapid deceleration of the vehicle.

Latching mechanisms for tiltable seat back rests have heretofore been provided. Some of these latching mechanisms have also been operable to normally latch the seat back rest in a normal upright position, allow slow forward tilting movement of the seat back and prevent forward tilting movement of the seat back, when in an upright position, upon rapid deceleration of the vehicle. Such latching mechanisms are disclosed in U.S. Pat. No. 2,873,794, assigned to the same assignee as the present invention.

The present invention provides a novel latching mechanism of the character described above, but which is of a simple construction, has a minimum number of parts, is lightweight and can be used with or without a seat reclining mechanism for moving the seat back rest to a reclined position located rearwardly of its normal upright position.

Accordingly, an object of the present invention is to provide a novel, simple latching mechanism for a tiltable seat back rest which is operable to latch the seat back rest against forward movement when in its normal upright position, in a position slightly forwardly of its normal upright position, in a position rearwardly of its normal upright position when used with a seat recliner mechanism, which allows slow forward tilting movement of the seat back rest when folded forward, and which is inertia responsive to prevent forward tilting of the seat back rest upon rapid deceleration of the vehicle regardless of the position of the seat back rest.

A further object of the present invention is to provide a novel latching mechanism of the character described in the preceding object and which is of a relatively simple construction comprising a minimum number of parts, which is lightweight and which can be used with or without a seat reclining mechanism.

Another object of the present invention is to provide a novel latching mechanism of the character described in the preceding objects and in which the latching mechanism comprises a hinge arm on the tiltable back rest and pivotally supported by a seat frame means and with the hinge arm at its lower end having spaced abutments, a latch lever pivotally supported by the seat frame means and having spaced abutments, and wherein one of the abutments on the hinge arm at all times engages one of the abutments on the latch lever to hold the same against its gravity bias to a position in which the other abutment thereof is disposed within the path of movement of the other abutment on the hinge arm whereby, due to inertia forces acting on the latch lever, the seat back rest is at all times latched against rapid forward movement upon rapid deceleration of the vehicle.

A more specific object of the present invention is to provide a novel latching mechanism for a seat assembly for automotive vehicles having a seat and a seat back rest which is pivotally supported for movement between a fully upright position and a forward position in which it generally overlies the seat, and in which the latching mechanism comprises a hinge arm on the back rest whose lower end defines first and second spaced abutments, an inertia responsive latch lever pivotally supported by the seat frame for movement about an axis and having first and second spaced abutments, wherein the latch lever is gravity biased for movement toward a position in which a first abutment thereof would not be disposed in the path of movement of the first abutment on the hinge arm, wherein the second abutment on the hinge arm engages the second abutment on the latch lever when in its upright position to hold the latch lever against its gravity bias in an operative position in which the first abutment thereof is disposed in the path of movement of the first abutment on the hinge arm, wherein the latch lever, due to its gravity bias, pivotally moves with the hinge arm of the back rest when the latter is slowly moved from an upright position toward its forward position, and wherein the latch lever, due to inertia forces, remains in its operative position upon movement of the hinge arm and back rest toward its forward position when the seat assembly is subjected to rapid deceleration forces to prevent forward movement of the seat back rest.

Yet another object of the present invention is to provide a novel latching mechanism, as defined in the preceding object, and in which the seat back rest can be moved to a reclined position rearwardly of its fully upright position and wherein the hinge arm has a third abutment which engages the latch lever to hold the latter in an operative position wherein the first abutment thereof is disposed within the path of movement of the hinge arm whereby, due to inertia forces acting on the latch lever, the latter will prevent rapid forward movement of the seat back rest when the latter is subject to rapid deceleration forces in any of its reclined positions.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 1 is a partial elevational view of a vehicle seat assembly incorporating the novel latching mechanism of the present invention;

FIG. 2 ia an enlarged view of part of FIG. 1 and with certain parts shown partially broken away or in section;

FIG. 4 is a view similar to that shown in FIG. 2, but with various parts thereof shown in different positions;

FIG. 5 is a view similar to that shown in FIG. 2, but with various parts thereof shown in different positions; and FIG. 6 is a partial elevational view looking in the direction of the arrows 6—6 of FIG. 4.

The present invention provides a novel inertia responsive latching mechanism for a vehicle seat assembly having a seat or seat unit and a tiltable back rest or back rest unit.

Figure 1:
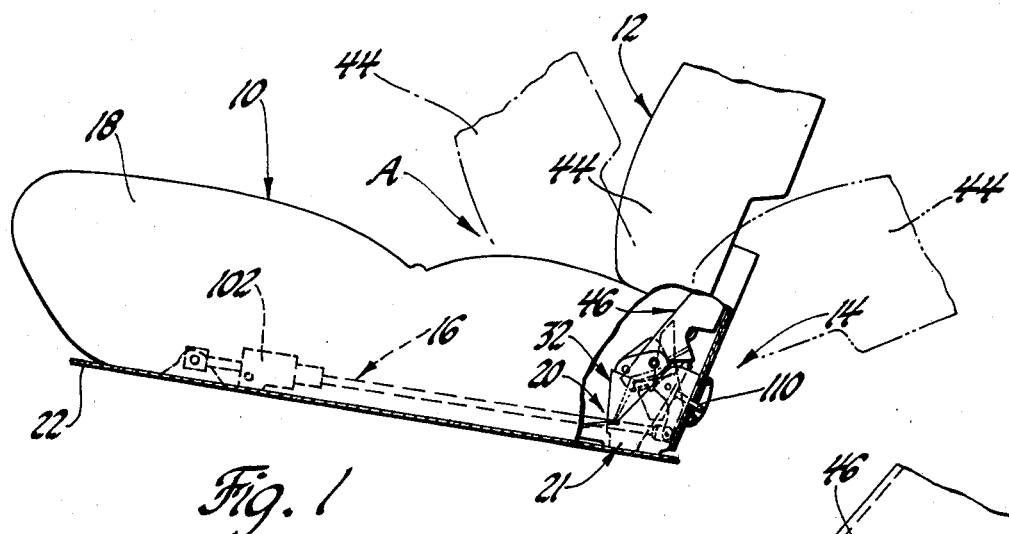

Referring to FIG. 1, a vehicle seat assembly A is there shown which comprises, in general, a seat or seat unit 10, a tiltable back rest or back rest unit 12 and a latching mechanism 14 which is operable to normally latch the back rest 12 against rapid forward movement when in an upright position, as shown by the solid lines in FIG. 1, which allows slow forward tilting movement of the seat back 12 without manual manipulation of the latching mechanism 14 to enable the seat back rest 12 to be moved toward a forward position in which it overlies the seat 10, as shown by the phantom lines in FIG. 1, and which is operable, due to inertia forces, to prevent significant forward tilting movement of the seat back rest 12 upon rapid deceleration of the seat assembly A, such as occurs when a vehicle's brakes are suddenly applied. In the illustrated embodiment, the seat assembly also includes a back rest recliner mechanism 16 to allow the seat back rest 12 to be moved rearwardly from its normally upright position to a reclined position, such as illustrated by the dotted lines in FIG. 1, and with the latching mechanism 14 also being operable to latch the seat back rest 12 in its reclined position.

Figure 2:
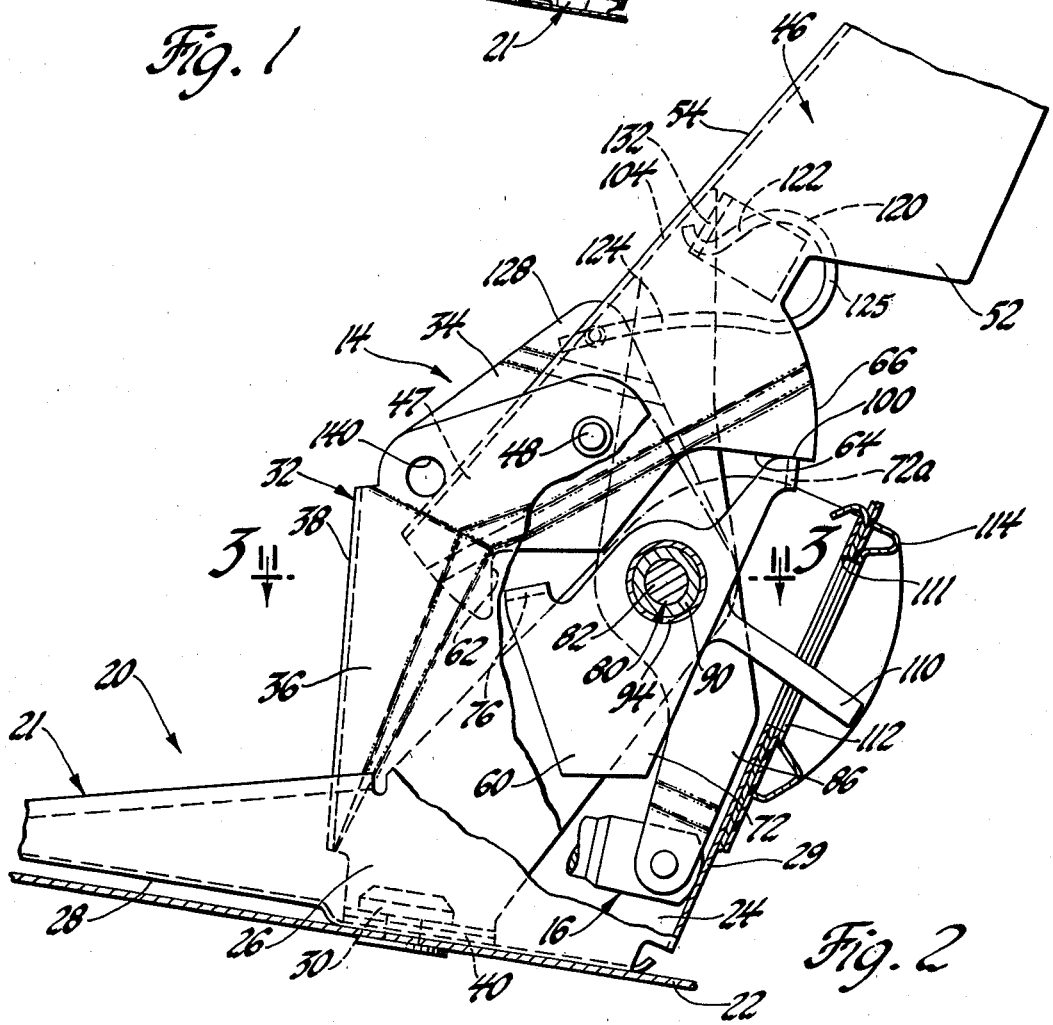

The seat unit 10 comprises a cushion 18 which is suitably supported on a seat frame or seat frame means 20 comprising a first seat frame 21 which is secured to a floor portion 22 of an automotive vehicle. The seat frame 21 comprises a generally U-shaped metal stamping having a pair of spaced side walls 24 and 26, a bottom wall 28 and an upright end wall 29. The walls 24 and 26 extend both forwardly of the seat 10 and upwardly and rearwardly of the seat, as shown in FIG. 2. The bottom wall 28 of the seat frame 21 is secured to the vehicle floor 22 by suitable fasteners 30.

The seat frame means 20 also includes a second seat frame member 32 which is a generally U-shaped metal stamping having a pair of spaced side walls 34 and 36, an end wall 38 and a bottom wall 40. The bottom wall 40 is secured to the bottom wall 28 of the first seat frame 21 and also bolted to the vehicle floor 22 by the fasteners 30, as shown in FIG. 2.

Figure 3:
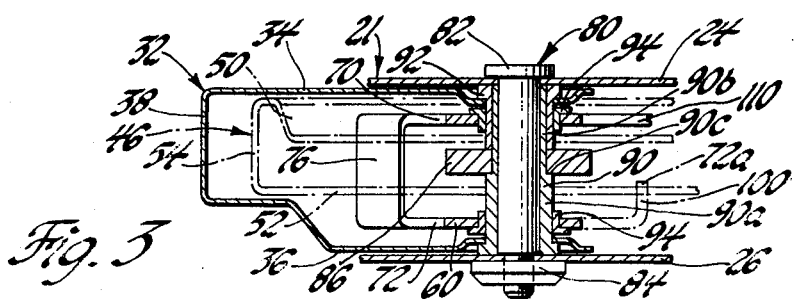
FIG. 3 is a cross-sectional view taken approximately along the line 3—3 of FIG. 2 and with parts above line 3—3 being shown in phantom.

The seat back unit 12 comprises a back rest cushion 44 carried by a pair of hinge arms 46 (only one of which is shown). The hinge arm 46 is pivotally supported adjacent its lower end 47 by the second frame member 32 via a pivot pin means 48. As best shown in FIG. 3, the lower end of the hinge arm 46 is disposed between the sides 34 and 36 of the frame member 32. The frame member 32 in turn is disposed between the spaced sides 24 and 26 of the frame member 21. The pivot pin means 48 extends through aligned openings in the side 36 of frame member 32, the hinge arm 46 and the side 34 of the frame member 32. The hinge arm 46 comprises a U-shaped metal stamping having spaced side walls 50 and 52 and an end wall 54, as best shown by the phantom line in FIG. 3. The side wall 50 of the hinge arm 46 adjacent its lower end is bent inwardly so that the side walls adjacent the lower end of the hinge arm are closer together than at the upper part of the hinge arm 46.

The latching mechanism 14 comprises one of the hinge arms 46 and an inertia responsive latch means or latch lever 60. The side walls 50 and 52 of the hinge arm 46 have lower edges configured or shaped so as to define a first abutment means or abutment surface 62, a second abutment means or abutment surface 64 and a third abutment means or abutment surface 66. The abutment means 62, 64 and 66 are spaced from each other.

The first abutment means 62 is tooth shaped to define a pair of spaced catch members. The second abutment means or surface 64 is planar and generally horizontal when the seat back is in its upright position. The third abutment means or abutment surface 66 is arcuate and concentric with the axis of the pivot pin means 48.

The latch lever 60 comprises a generally U-shaped metal stamping having a pair of spaced side walls 70 and 72 and a bridging end wall 76. The latch lever 60 is pivotally supported by the frame members 21 and 32 by a pivot pin means 80 and it is disposed directly beneath the lower end of the hinge arm 46. The pivot pin means 80 comprises a stud 82 and nut 84. The stud 80 extends through aligned openings in the sides 24 and 26 of the frame 21, the sides 34 and 36 of the frame member 32, the sides 70 and 72 of the lever 60 and an opening through a lever 86 of the seat recliner mechanism 16. The stud 80 carries a bearing sleeve 90 having a first diameter portion 90a and a reduced second diameter portion 90b. The diameter portions 90a and 90b at their juncture define a radially extending shoulder 90c. It also carries a second sleeve 92 which is positioned around the reduced diameter portion 90b of the sleeve 90. The sleeve 92 together with the shoulder 90c on sleeve 90 positions the lever 86 of the seat recliner mechanism 16 laterally between the sides of the frame means 20. The sides 70 and 72 of the latch lever 60 are rotatably supported on a pair of annular axially and radially flanged bearings 94. These bearings 94 allow the latch lever 60 to pivot freely, but also positions the latter laterally between the sides 34 and 36 of the frame member 32, as shown in FIG. 3.

The latch lever 60 is shaped as shown in FIGS. 2 and 3 and the bridging portion 76 thereof comrpises a first abutment or latch. The latch lever also has a leg portion 72a integral with the side 72. The leg portion 72a is bent at its end in a direction parallel to its pivot axis to provide a second abutment or abutment surface 100. The abutments 76 and 100 are located on opposite sides of the vertical plane passing through the axis of the pivot means 80.

The seat recliner mechanism 16 comprises the lever 86 and a means 102 for adjusting the position of the lever 86. The lever 86 is planar and is pivotally supported for movement in opposite directions by the sleeve 90 of the pivot pin means 80. The lever 86 has an upper end surface 104 against which the end wall 54 of the hinge arm 46 abuts. The lever 86 thus acts as a stop against which the seat back unit 12 rests when in its upright position, as shown in FIG. 2, or when in a reclined position, such as shown in FIG. 5. To recline the seat rearwardly from its normal upright position, as shown in FIG. 2, to a position, such as shown in FIG. 5, the lever 86 is rotated in a clockwise direction by pushing back on the back rest 12. To accomplish this, the actuator 102 is released to allow the lever 86 to rotate. Any suitable actuating means can be employed to allow movement of the seat back 12 between its normal upright position and a reclined position and vice versa. Accordingly, such means will not be described in detail. Suffice it to say, however, that an actuating means such as that disclosed in U.S. Pat. No. 3,271,071, issued Sept. 6, 1966, could be employed.

The latch lever 60 is weighted so as to be gravity biased toward the position shown in FIG. 4. That is, the forces of gravity tend to rotate the latch lever means 60 in a counterclockwise direction toward the position shown in FIG. 4.

When the seat back rest unit 12 is in its normal upright position, the respective parts are in the position shown in FIG. 2. In this position, the hinge arm 46 abuttingly engages surface 104 of the lever 86 of the recliner mechanism 16. This acts as a stop to position the seat back unit 12 in its upright position. Also, in this position the abutment surface 64 on the hinge arm engages abutment 100 on the latch lever means 60 to hold latch lever means 60 in a position in which its other abutment 76 is disposed within the path of movement of the abutment means or teeth 62 on the hinge arm 46. This prevents any significant movement of the seat back unit 12 in a forward direction or counterclockwise direction as viewed in FIG. 2.

Should the vehicle be subjected to rapid deceleration forces while the seat back unit 12 is in its upright position, the latch lever 60, due to inertia forces, will tend to rotate in a clockwise direction and thus maintain the abutment 76 within the path of movement of the teeth 62 of a hinge arm 46 and thereby prevent forward movement of the seat back unit 12.

The seat back unit 12 can be rotated in a counterclockwise direction or forwardly by slowly moving the same about the pivot pin means 48. Since the latch lever 60 is gravity biased toward the position shown in FIG. 4, the abutment 100 will remain in engagement with the abutment 64 on the side 52 on the hinge arm 46 as the hinge arm 46 is rotated forwardly. As this movement continues, the abutment 76 of the latch lever 60 will be positioned so as to allow the teeth 62 on the hinge arm to move therepast, as shown in FIG. 4.

When the seat back unit 12 is being restored to its fully upright position, the abutment surface 64 on the side 52 of the hinge arm will again engage the abutment 100 on the latch lever 60 to rotate the same in a clockwise direction. This movement continues until the seat is in its fully upright position, as shown in FIG. 2. In this position the abutment surface 64 on the side 52 of the hinge arm 46 will engage the abutment surface 100 of the latch lever 60 to position the abutment 76 thereof within the path of movement of the teeth 62 on the hinge arm 46.

It should be noted that the latch lever 60 also includes a handle 110 integral with the side 72 thereof which extends through aligned openings 111 and 112 in the rear side 29 of the frame 21 and an escutcheon 114 suitably secured to the frame 21, respectively. This enables the latch lever 60 to be manually manipulated should it remain engaged with the tooth members 62 due to the vehicle resting on a steep incline so as to allow release of the seat unit 12.

In the illustrated embodiment, the seat back unit 12 can also be pushed or moved rearwardly from its normal upright position, as shown in FIG. 2, to an infinitely adjustable reclined position, such as the maximum reclined position shown in FIG. 5. This is accomplished by manipulating the actuator means 102 to allow the lever 86 to be rotated in a clockwise direction and to allow the seat back unit 12 to be pushed back or moved to a reclined position. When the actuator means 102 is released from its reclined position, as shown in FIG. 5, the seat back unit 12 will be returned toward its normal upright position. As noted before, any suitable actuator means can be employed. But preferably it is of the type shown in U.S. Pat. No. 3,271,071.

To aid in moving the seat back unit 12 from its reclined position toward its normal upright position, as shown in FIG. 2, a wire spring means 120 is provided.

The spring means 120 is generally U-shaped and has a pair of legs 122 and 124 and an arcuate bight intermediate bight portion 125. The leg 124 is suitably bent at its end, as shown in FIG. 6, so as to extend through an aperture 126 in a flange 128 on the frame member 32. The other leg of the spring is suitably arcuately bent at its end so as to be located in a recess 130 on an L-shaped flange 132 suitably welded to the hinge arm 46. The bias of the spring 120 is such that the legs 122 and 124 are being compressed toward each other, but with their movement toward each other being limited by the abutting engagement between the arcuate end of leg 122 with the recessed flange 132 and the abutting engagement between the end of leg 124 and the flange 128 on the frame member 32. Thus, during movement of the seat back rest 12 from its normal upright position to a reclined position, abutting engagement between the ends of the legs 122 and 124 of the spring means 120 with the flange 132 on the hinge arm 46 and the flange 128 of the frame member 32 causes the bight portion 125 to be expanded, as shown in FIG. 5, and thus, the bias of the spring 20 resists the movement of the seat back to a reclined position. During movement of the seat back rest 12 from its reclined position, as shown in FIG. 5, toward its normal upright position, as shown in FIG. 2, the bias of the spring means 120 assists the movement toward the upright position.

It should be noted that the spring means 120 also functions as an over-center spring to retain the seat back rest 12 in its forward position, as shown in FIG. 4, when moved thereto.

When the seat back unit 12 is moved from its fully upright position to a reclined position, the abutment 100 on the latch lever means 60 rides on the abutment surface 64 of the hinge arm 46 until the abutment surface 100 on the hinge arm clears the abutment surface 64. When this occurs, the abutment surface 100 on the latch lever 60 engages the abutment surface 66 on the hinge arm 46 and rides thereon. This engagement maintains the latch lever 60 in a position such that its abutment 76 is maintained within the path of movement of the teeth 62 on the hinge arm 46.

Should rapid deceleration forces be exerted on the seat back unit 12 while the seat back unit 12 is in a reclined position, the inertia forces acting on the latch lever 60 will rotate the same in a clockwise direction to maintain it in a position in which the abutment 76 is disposed within the path of movement of the teeth 62 on the hinge arm 46. This will prevent the seat back unit 12 from being thrown forwardly, upon rapid deceleration of the vehicle, past its normal upright position.

It should be noted that as the result of the engagement between the abutment surface 64 of the hinge arm 46 and the abutment surface 100 of the latch lever 60 the latching mechanism 14 is also operable to maintain the latch lever 60 in a position such that its abutment 76 is disposed within the path of movement of the teeth 62 on the hinge arm 46 even if the seat back unit 12 is not fully returned to its normal upright position, but is located forwardly of its normal upright position. Such a condition could occur, for example, if cargo located behind the seat unit 12 prevents the latter from being fully moved to its normal upright position. Thus, the latching mechanism 14 is operable to prevent forward movement of the seat back unit 12 upon rapid deceleration of the vehicle even if the seat back unit 12 is located forwardly of its normal upright position.

While the latching mechanism 14 has been shown in the illustrated embodiment for use in conjunction with a seat assembly having a seat recliner mechanism, it should be understood that the same identical latching mechanism could be used in a tiltable seat back rest without the seat back recliner mechanism 16. If no seat back recliner mechanism is desired, it can simply be eliminated and a stop in the form of a pin (not shown) which extends through aligned openings 140 in the side walls 34 and 36 of the frame member 32 can be provided. As best viewed in FIG. 2, if such a pin means were provided it would form a stop to position the seat back unit 12 in an upright position.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A seat assembly for an automotive vehicle comprising:
    a seat cushion supported on a seat frame means which is adapted to be mounted to vehicle support structure,
    a backrest including a side hinge arm pivotally supported by said seat frame means for movement about a first pivot axis between a first position in which said backrest is generally vertically disposed and a second position in which said backrest overlies at least a portion of said seat cushion,
    said hinge arm having integral spaced first and second abutments movable therewith in a path of movement concentric with said first pivot axis,
    a one-piece inertia responsive latch means pivotally supported by said seat frame means for movement about a second pivot axis, said latch means comprising a U-shaped member having a pair of spaced side walls and a bight portion at one end which defines a first abutment, one of said side walls at its end remote from the bight portion having a leg portion extending transversely thereof and which defines a second abutment, the other of said side walls including a handle portion which extends through an aperture in said seat frame whereby the latch lever means can be manually manipulated, if necessary,
    said latch means being gravity biased for movement toward a position in which the first abutment thereof would not be disposed within the path of movement of said first abutment of said hinge arm,
    said second abutment on said hinge arm being engageable with the second abutment of said latch means when in its first position to hold said latch means against its gravity bias in an operative position in which the first abutment thereof is disposed within the path of movement of said first abutment of said hinge arm,
    said latch means due to its gravity bias being pivotally movable with the hinge arm of the backrest when the latter is slowly moved from its first position toward its second position,
    said latch means, due to inertia forces, remaining in its operative position to prevent movement of said hinge arm and backrest toward its second position when said seat assembly is subjected to rapid deceleration forces.

2. A seat assembly for an automotive vehicle comprising:
    seat cushion supported on a seat frame means which is adapted to be mounted to vehicle support structure,
    a backrest cushion supported by a backrest frame means including a side support hinge arm pivotally supported by said seat frame means for movement about a first pivot axis between an upright position in which said backrest is generally vertically disposed and a forward position in which said backrest overlies said seat cushion,
    said hinge arm having an integral first abutment defining a catch and a second abutment spaced from said first abutment,
    said first and second abutments being movable in a path of movement concentric with said first pivot axis,
    a one-piece inertia responsive latch lever pivotally supported by said seat frame means for movement about a second pivot axis extending parallel to but transversely spaced from said first pivot axis,
    said latch lever comprising a U-shaped member having a pair of spaced side walls and a bight portion at one end which defines a first abutment, one of said side walls at its end remote from the bight portion having a leg portion extending transversely thereof and which defines a second abutment, the other of said side walls including a handle portion which extends through an aperture in said seat frame means whereby the latch lever can be manually manipulated, if necessary,
    said second abutment of said hinge arm being engageable with said second abutment of said latch lever when the backrest is in its upright position to hold said latch lever in an operative position in which the first abutment thereof is disposed within the path of movement of said first abutment of said hinge arm,
    said latch lever being gravity biased for movement toward a position in which said first abutment thereof would not be disposed within the path of movement of said first abutment of said hinge arm,
    said latch lever due to its gravity bias being pivotally movable with the hinge arm of the backrest when the latter is slowly moved from its upright position toward its forward position, and
    said latch lever, due to inertia forces, remaining in its operative position to prevent movement of said hinge arm and backrest toward its forward position when said seat assembly is subjected to rapid deceleration forces.

3. A seat assembly for an automotive vehicle comprising:
    a seat cushion supported on a seat frame means which is adapted to be mounted to vehicle support structure,
    a backrest including a side hinge arm pivotally supported by said seat frame means for movement about a first pivot axis between a normal upright position in which said backrest is generally vertically disposed, a second position in which said backrest overlies at least a portion of said seat cushion, and a reclined position in which said backrest forms an obtuse included angle with said seat cushion, seat recliner means for normally positioning said backrest in its upright position and which is operable to allow said backrest to be moved to a reclined position, said hinge arm having integral spaced first, second and third abutment surfaces movable therewith in a path of movement concentric with said first pivot axis, said third abutment surface being arcuate and intersecting said second abutment surface, an inertia responsive latch lever pivotally supported by said seat frame means for movement about a second pivot axis and having spaced first and second abutments, said latch lever being gravity biased for movement toward a position in which the first abutment thereof would not be disposed within the path of movement of said first abutment of said hinge arm, said second abutment surface on said hinge arm being engageable with the second abutment of said latch lever when the backrest is in its normal upright position to hold said latch lever against its gravity bias in an operative position in which the first abutment thereof is disposed within the path of movement of said first abutment surface of said hinge arm, said latch lever due to its gravity bias being pivotally movable with the hinge arm of the backrest when the latter is slowly moved from its first position toward its second position, said second abutment surface of said hinge arm camming said latch lever against its gravity bias when said backrest is moved toward a reclined position until the second abutment of the latch lever clears said second abutment surface on the hinge arm whereupon the latch lever due to its gravity bias engages the third arcuate abutment surface of the hinge arm to maintain the latch lever in its operative position, said latch lever, due to inertia forces, remaining in its operative position to prevent any significant forward movement of said hinge arm and backrest when said seat assembly is subjected to rapid deceleration forces.

4. A seat assembly for an automotive vehicle comprising:

a seat cushion supported on a seat frame means which is adapted to be mounted to vehicle support structure, a backrest including a side hinge arm pivotally supported by said seat frame means for movement about a first pivot axis between a normal upright position in which said backrest is generally vertically disposed, a second position in which said backrest overlies at least a portion of said seat cushion, and a reclined position in which said backrest forms an obtuse included angle with said seat cushion, seat recliner means for normally positioning said backrest in its upright position and which is operable to allow said backrest to be moved to a reclined position, said hinge arm having integral spaced first, second and third abutment surfaces movable therewith in a path of movement concentric with said first pivot axis, said third abutment surface being arcuate and intersecting said second abutment surface, an inertia responsive latch lever pivotally supported by said seat frame means for movement about a second pivot axis, said latch lever comprising a stamped bifurcated metallic member having a pair of spaced legs, a bight portion defining a first abutment and an L-shaped portion on one of said legs opposite the bight portion which defines a second abutment, said latch lever being gravity biased for movement toward a position in which the first abutment thereof would not be disposed within the path of movement of said first abutment of said hinge arm, said second abutment surface on said hinge arm being engageable with the second abutment of said latch lever when the backrest is in its normal upright position to hold said latch lever against its gravity bias in an operative position in which the first abutment thereof is disposed within the path of movement of said first abutment surface of said hinge arm, said latch lever due to its gravity bias being pivotally movable with the hinge arm of the backrest when the latter is slowly moved from its first position toward its second position, said second abutment surface of said hinge arm camming said latch lever against its gravity bias when said backrest is moved toward a reclined position until the second abutment of the latch lever clears said second abutment surface on the hinge arm whereupon the latch lever due to its gravity bias engges the third arcuate abutment surface of the hinge arm to maintain the latch lever in its operative position, said latch lever, due to inertia forces, remaining in its operative position to prevent any significant forward movement of said hinge arm and backrest when said seat assembly is subjected to rapid deceleration forces.

* * * * *

UNITED STATES PATENT AND TRADEMARK OFFICE
CERTIFICATE OF CORRECTION

PATENT NO. : 4,390,208
DATED : June 28, 1983
INVENTOR(S) : Paul Widmer; Robert R. Mercer It is certified that error appears in the above-identified patent and that said Letters Patent are hereby corrected as shown below:

Claim 2, column 8, line 5, insert "a" at beginning of line.

Claim 4, column 10, line 46, delete "engges" and insert -- engages --.

Signed and Sealed this

Thirty-first Day of January 1984

[SEAL]

Attest:

GERALD J. MOSSINGHOFF

Attesting Officer  Commissioner of Patents and Trademarks